No. 818,796. PATENTED APR. 24, 1906.
J. SPENGLER.
HAND PRESS.
APPLICATION FILED SEPT. 27, 1905.

WITNESSES:
Johna Bengetron
C. E. Fay

INVENTOR
Jacob Spengler
BY
ATTORNEYS

UNITED STATES PATENT OFFICE.

JACOB SPENGLER, OF GREAT FALLS, MONTANA.

HAND-PRESS.

No. 818,796.  Specification of Letters Patent.  Patented April 24, 1906.

Application filed September 27, 1905. Serial No. 280,309.

*To all whom it may concern:*

Be it known that I, JACOB SPENGLER, a citizen of the United States, and a resident of Great Falls, in the county of Cascade and State of Montana, have invented a new and Improved Hand-Press, of which the following is a full, clear, and exact description.

My invention relates to hand-presses which can be used for many purposes. A typical use for the device is that of pressing meats, and I will describe the invention with particular relation thereto, although it can be used for pressing vegetables, fruit, and the like.

Meat-presses as heretofore constructed have usually been made with only one meat-box, and therefore when used in certain ways they are not economical.

One of the principal objects of my invention is to provide a device which can be used with the greatest of economy by large and small concerns alike, so that those who have to press meat in varying quantities and of several different kinds at once need not invest in more than one complete press with all attachments. For accomplishing this result I provide a special form of base, with which is connected a cross-head adjustable toward and from the base and provided with a compressing means. With this device I provide a series of meat-boxes, each one fitting within the walls of the one below, so that the device can be used for compressing any desired amount of meat within the limits of the press by simply using the required number of meat-boxes. Furthermore, the operator can compress a different kind of meat in each box, if desired, and can leave the boxes with the meat therein in an ice-box or can provide the press itself with an ice-holder, so that the meat can be left to cool under pressure.

Further objects and advantages of my invention will appear below.

Reference is to be had to the accompanying drawings, forming a part of this specification, in which similar characters of reference indicate corresponding parts in all the figures.

Figure 1:
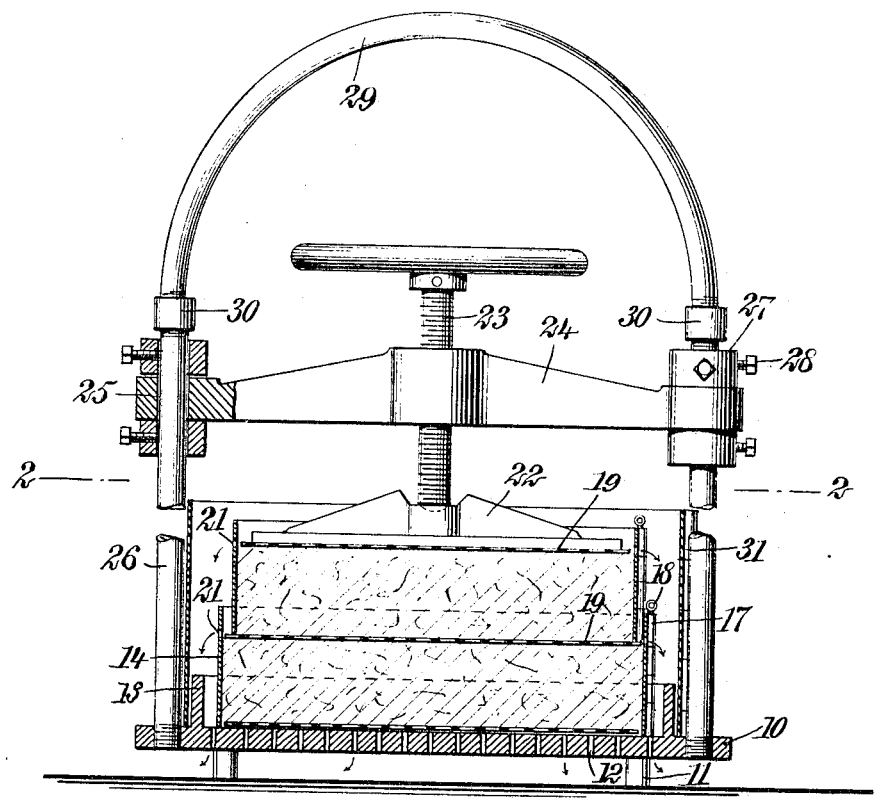
Figure 2:
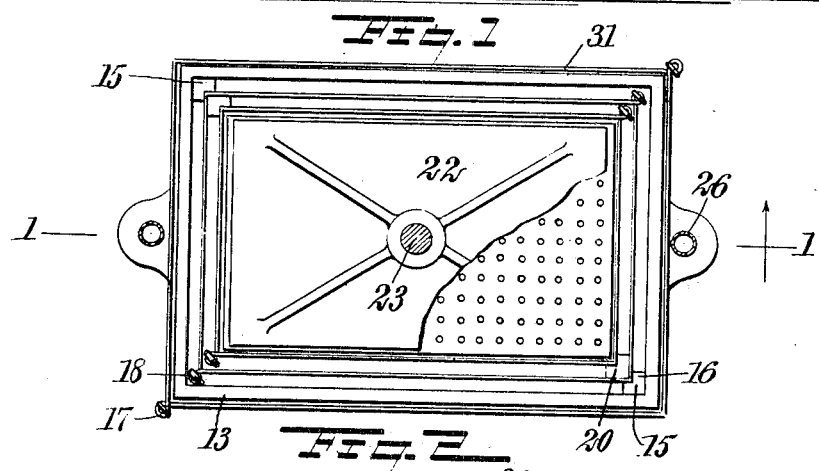
Figure 3:
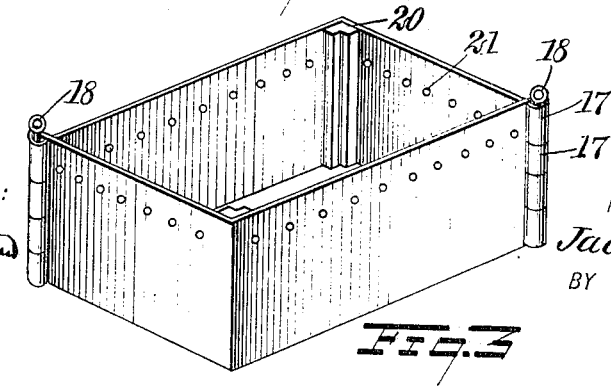

Figure 1 is a central vertical sectional view on the line 1 1 of Fig. 2, showing a press constructed in accordance with the principle of my invention. Fig. 2 is a sectional view of the same on the line 2 2 of Fig. 1, and Fig. 3 is a perspective view of one of the meat-boxes which I prefer to employ.

I have shown a base 10, standing on legs 11, so as to be spaced from its support, and provided with perforations 12, through which water and grease expressed from the meat or juices expressed from vegetables or fruit can be drawn. The upper side of the base is provided with a flange 13, surrounding a portion of the base and adapted to hold such liquids as may be expressed from the material operated upon until it can drain through the perforations 12. This flange is also adapted to receive the bottom of a series of meat-boxes, which I have designated 14. The flange is provided on two opposite corners with blocks 15, having reëntrant angles 16 for receiving the two opposite corners of the box 14. This box is made of such size that two of its corners will fit in the reëntrant angles 16 and is formed at its opposite angles with means for detaching its sides from each other, whereby the box can be readily removed from the compressed material. This means I have shown in the form of a series of alternate tubular projections 17 on the sides and ends of the box, respectively, these projections being held together by a pin 18, passing through them.

I prefer to provide the device with a series of boxes like the one described and make each one of such size that it can rest upon the top of the material in the one below and be forced into it in the act of compressing. For this purpose I provide a series of perforated plates 19 and locate one upon the top of each of the boxes. These plates are small enough to enter the boxes and are cut out at the corners to fit blocks 20, which are similar to the blocks 15 and are located in two opposite corners of each of the boxes. The box next beneath is then placed on this perforated plate and is adapted to be forced down into the box below with the plate. Each of the boxes is provided with a series of perforations 21 near the top for discharging liquids expressed from the box above. Above the highest plate 19 is a press-plate 22, which is provided with means for forcing it into the top box and exerting the desired pressure upon it. This means I have illustrated in the form of an ordinary hand-screw 23, supported by a cross-head 24. This cross-head is provided with perforations 25, by means of which it is mounted upon a pair of uprights 26, that are supported by the base 10.

In order that the press may be used either with one box or with several of them and without unduly lengthening the screw 23, I have made the cross-head adjustable. For this purpose I have provided a series of collars 27, each having set-screws 28, by means of which it is adapted to be connected with an upright 26 and firmly secured thereto. These set-screws can be loosened and the cross-head placed in any desired position, after which the screws are tightened to secure it in such adjusted position. The two uprights are preferably connected with a yoke 29 by means of screw-threaded collars 30. It will of course be understood that the number of boxes for containing the material to be operated upon is immaterial. Presses can be made with a greater or smaller number, according to the work to be done, and the same press can be used with any number less than that for which it is designed.

If it is desired to use the press for cooling the meat—in other words, to allow the meat to remain cool while under pressure—I locate a box 31 between the flange 13 and the uprights 26, and between this and the boxes 14 I place ice. The box 31 is made substantially in the form of that of the boxes 14, except that the corner-pieces 20 are not employed. It can therefore be disassembled and placed in position when the material in the boxes 14 is under pressure.

It will be understood that the press will in practice be made in different sizes and that while in small presses but one compressing-screw will be employed in large presses two or more compressing-screws will be employed, as may be desired and as necessity may require.

Having thus described my invention, I claim as new and desire to secure by Letters Patent—

1. A press having a perforated base provided with an upwardly-extending flange forming a receptacle, in combination with a series of boxes mounted one above another in said receptacle, for containing the material to be compressed, a series of perforated plates located between the several boxes, and means supported by the base for exerting a pressure on the material in the boxes; each of said boxes comprising side walls removably connected together at two opposite corners, said side walls being perforated near their upper edges.

2. A press having a series of boxes each provided with means for removably connecting the walls together at two opposite corners and each having a block in each of the remaining corners provided with a reëntrant angle for receiving the corner of a smaller box placed above, a series of perforated plates located between the several boxes, and adjustable means for exerting pressure.

3. A press having a perforated base provided with an upwardly-extending flange forming a receptacle, in combination with a series of boxes mounted one above another in said receptacle, for containing the material to be compressed, a series of perforated plates located between the several boxes, means supported by the base for exerting a pressure on the material in the boxes, each of said boxes comprising side walls removably connected together at two opposite corners, said side walls being perforated near their upper edges, and a receptacle mounted outside of said flange for receiving and holding ice on the exterior of said boxes.

In testimony whereof I have signed my name to this specification in the presence of the subscribing witnesses.

JACOB SPENGLER.

Witnesses:
  E. A. NEWLON,
  EDGAR A. NEWLON,
  ROBERT P. RICHARDS.